(12) United States Patent
Winter

(10) Patent No.: US 7,991,008 B2
(45) Date of Patent: Aug. 2, 2011

(54) METHOD FOR IDENTIFYING THE TRANSMISSION CONTROL PROTOCOL STACK OF A CONNECTION

(75) Inventor: Robert L. Winter, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 12/146,896

(22) Filed: Jun. 26, 2008

(65) Prior Publication Data

US 2009/0323682 A1  Dec. 31, 2009

(51) Int. Cl.
*H04J 3/24* (2006.01)
*H04J 1/16* (2006.01)
*H04J 3/14* (2006.01)
*G01R 31/08* (2006.01)
*G06F 11/00* (2006.01)
*G06F 15/16* (2006.01)
*G06F 7/04* (2006.01)
*G06F 17/30* (2006.01)
*G08C 15/00* (2006.01)
*H04L 1/00* (2006.01)
*H04L 12/26* (2006.01)
*H04L 29/06* (2006.01)

(52) U.S. Cl. ........ 370/474; 370/231; 370/252; 709/228; 726/4

(58) Field of Classification Search .................. 370/252
See application file for complete search history.

(56) References Cited

U.S. PATENT DOCUMENTS

| | | | | |
|---|---|---|---|---|
| 5,793,763 | A * | 8/1998 | Mayes et al. | 370/389 |
| 6,975,647 | B2 | 12/2005 | Neale et al. | |
| 7,082,467 | B2 | 7/2006 | Border et al. | |
| 2002/0188730 | A1* | 12/2002 | Tang et al. | 709/227 |
| 2004/0153669 | A1* | 8/2004 | Yang et al. | 713/201 |
| 2004/0264481 | A1* | 12/2004 | Darling et al. | 370/401 |
| 2005/0256957 | A1* | 11/2005 | Shay | 709/225 |
| 2006/0191003 | A1* | 8/2006 | Bahk et al. | 726/14 |
| 2006/0230129 | A1* | 10/2006 | Swami et al. | 709/223 |
| 2007/0025374 | A1* | 2/2007 | Stefan et al. | 370/401 |
| 2007/0121516 | A1* | 5/2007 | Hannel et al. | 370/241 |
| 2007/0233886 | A1* | 10/2007 | Fan | 709/230 |
| 2007/0300290 | A1* | 12/2007 | Shay et al. | 726/3 |

OTHER PUBLICATIONS

Tsutsumi et al., Secure TCP—Providing Security Functions in TCP Layer, INET'95, Aug. 7, 1995, available at http://www.isoc.org/inet95/proceedings/PAPER/144/abst.html.

* cited by examiner

*Primary Examiner* — Andrew Chriss
(74) *Attorney, Agent, or Firm* — Baker Botts L.L.P.

(57) ABSTRACT

A method for identifying the TCP stack type of a transmitting node is disclosed in which a SYN packet is identified by the setting of the SYN bit in the packet. Following the identification of a set SYN bit in the SYN packet, the content of the data field includes a code to identify the TCP stack type associated with the node that transmitted the SYN packet.

14 Claims, 3 Drawing Sheets

| STACK TYPE | STACK IDENTIFIER |
|---|---|
| TCP SOFTWARE | 001 |
| TCP CHIMNEY | 010 |
| TCP STATE FULL | 011 |
| TCP STATE LESS | 100 |

METHOD FOR IDENTIFYING THE TRANSMISSION CONTROL PROTOCOL STACK OF A CONNECTION

TECHNICAL FIELD

The present disclosure relates generally to computer systems and information handling systems, and, more particularly, to a method for identifying the transmission protocol stack.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system, including computer systems, may communicate with one another according to the TCP/IP (Transmission Control Protocol/Internet Protocol) communication standard, which is one foundation of communication through the Internet. Each transmitting and receiving node is associated with a TCP/IP stack. The TCP/IP stack is the software that implements TCP/IP. The TCP/IP stacks of each node may vary by type. For example, a node may operate according to a TCP stack that is TCP offload engine-based or operating system software based, but there is no mechanism for identifying the TCP stack type to other nodes in the communication network. For a connection between two nodes, knowledge of the type of TCP stack associated each node could be useful with respect to security and resource allocation decision making.

SUMMARY

In accordance with the present disclosure, a method for identifying the TCP stack type of a transmitting node is disclosed in which a SYN packet is identified by the setting of the SYN bit in the packet. Following the identification of a set SYN bit in the SYN packet, the content of the data field includes a code to identify the TCP stack type associated with the node that transmitted the SYN packet. The TCP stack type identification method and system set out herein is advantageous in that it provides a method for identifying the TCP stack type of a node that is transmitting according to the TCP/IP protocol, thereby enabling security and resource allocation decision-making that is dependent on the stack type of the transmitting node. The TCP stack identification method and system is also advantageous in that it operates within the existing fields of a TCP packet. Thus, additional formatting of a TCP packet is not necessary. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figures 1, 3:
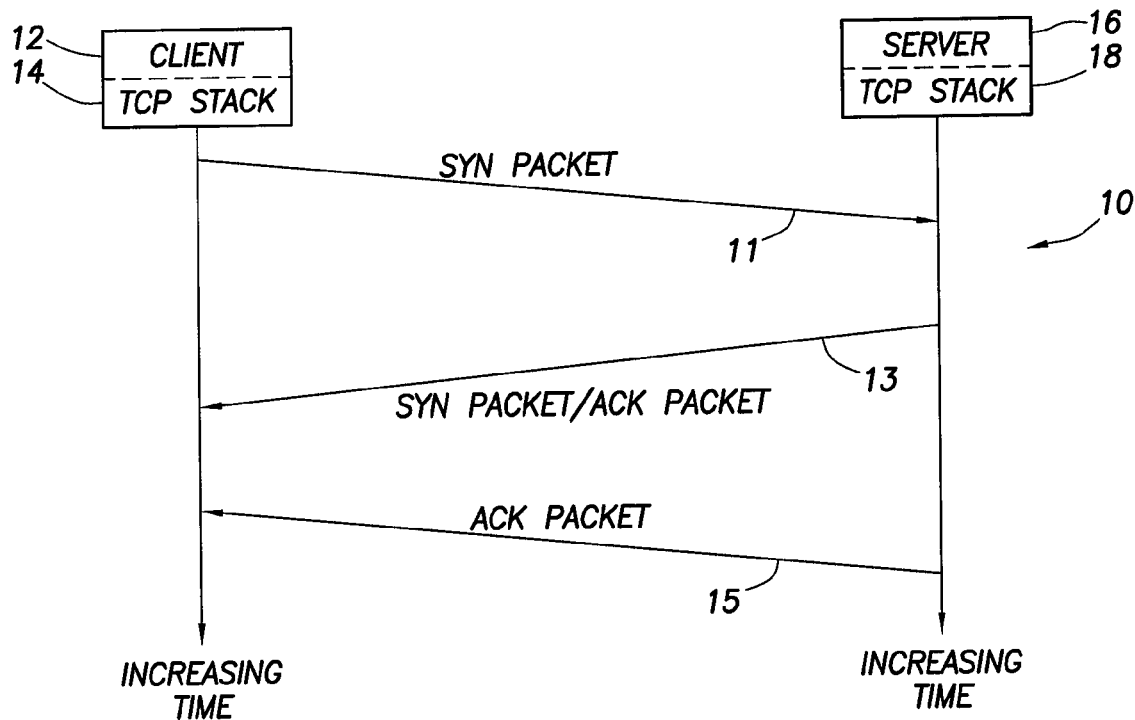
FIG. 1 is a logical diagram of a TCP/IP connection.
FIG. 3 is a table of a set of TCP stack types and stack identifiers.

Shown in FIG. 1 is a logical diagram of a TCP/IP connection, which is indicated generally at 10, between two communications nodes, which are identified as a client node 12 and a server node 16. Client node 12 includes a client TCP stack 14, and server node 16 includes a server TCP stack 18. A communication session between client node 12 and server node 16 may begin with the transmission of a pair of synchronization, or SYN, packets and acknowledgement, or ACK packets. At step 11, client node 12 transmits a SYN packet to server node 16. At step 13, server node 16 returns two packets to client node 12. One of the two packets is a ACK packet, which serves to acknowledge that server node 16 received the SYN packet from client node 12. The other packet of a SYN packet that is transmitted from the server node 16 in this example to the client node 12. After the client node 12 receives the SYN packet and the ACK packet from the server node 16, client node 12 returns at step 15 an ACK packet to the server node 16. As can be seen from the flow of synchronization messages in FIG. 1, each node sends to the other a SYN packet 20.

Figure 2:
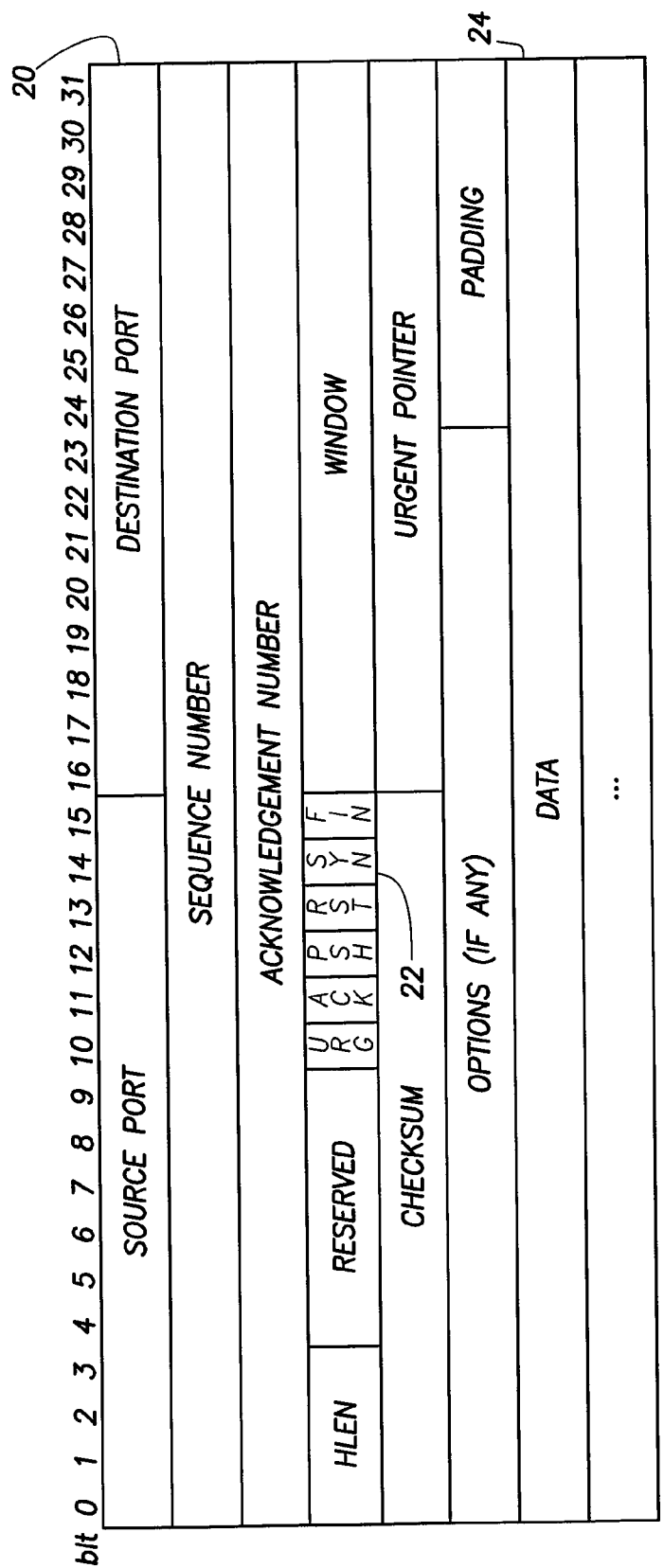
FIG. 2 is a diagram of the format of a TCP packet.

Shown in FIG. 2 is a diagram of the format of a TCP packet 20. The first two bytes of the packet are the source port of the transmission; and the second two bytes of the packet are the destination port of the transmission. Packet 20 includes a synchronization bit at 22. If this bit is set to a logical 1, then it is understood that the packet is a SYN packet. When the synchronization bit 22 is set, the packet is a SYN packet and the data field 24 includes an identifier of the TCP stack type of the transmitting node. An example of a set of TCP stack types and stack identifiers is included in the table 30 in FIG. 3. As one example, if code 001 is included in data field 24, then it is known that the TCP stack type of the transmitting node is a TCP stateless stack type.

Figure 4:
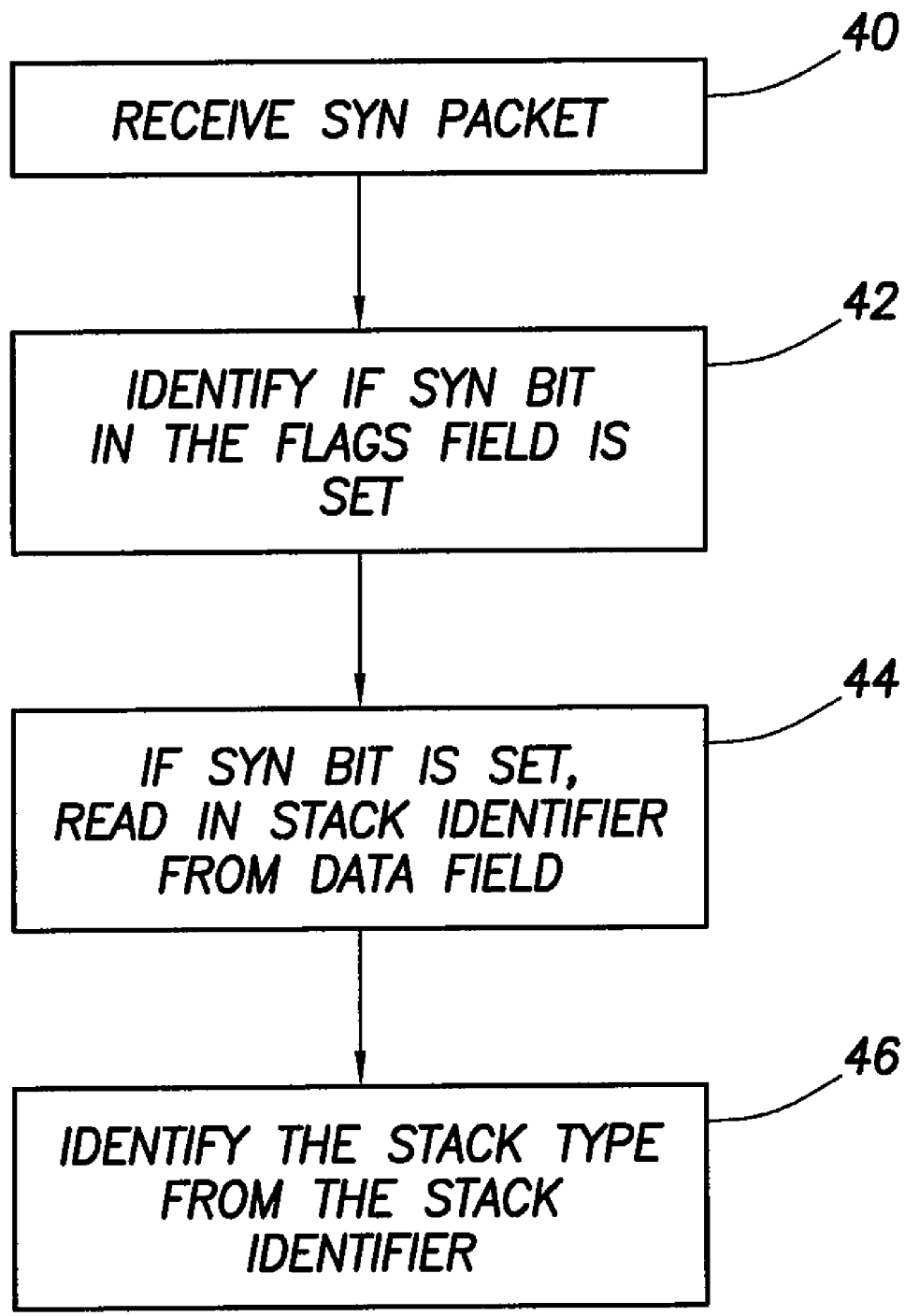
FIG. 4 is a flow diagram of method steps for identifying a SYN packet that includes an identification of a TCP stack type of the transmitting node

Shown in FIG. 4 is a series of method steps for identifying a SYN packet that includes an identification of a TCP stack type of the transmitting node. At step 40, a node receives a packet from a transmitting node. At step 42, the receiving node identifies whether the SYN bit of the packet has been set, indicating that the packet is a SYN packet. If the SYN packet has been set, the receiving node at step 44 reads in the stack identifier from the data field of the SYN packet. After the receiving node reads in the identifier for the stack type, the receiving node can associate at step 46 the identifier to a stack type for the transmitting node. Once the receiving node is aware of the stack type of the transmitting node, the receiving node can issue an appropriate set of security or resource allocations on the basis of the stack type of the transmitting node.

The TCP stack type identification method and system set out herein is advantageous in that it provides a method for identifying the TCP stack type of a node that is transmitting according to the TCP/IP protocol, thereby enabling security and resource allocation decision-making that is dependent on the stack type of the transmitting node. The TCP stack identification method and system is also advantageous in that it operates within the existing fields of a TCP packet. Thus, additional formatting of a TCP packet is not necessary. Although the present disclosure has been described in detail, it should be understood that various changes, substitutions, and alterations can be made hereto without departing from the spirit and the scope of the invention as defined by the appended claims.

What is claimed is:

1. A method for identifying the TCP stack type of a transmitting node, comprising:
    identifying a transmission from the transmitting node as a transmission that includes a SYN packet;
    reading in from the SYN packet an identification of the TCP stack type of the transmitting node, where the identification is read from a data field of the SYN packet, and wherein the identification of the TCP stack type is based, at least in part, on multiple bits of information; and
    determining the TCP stack type of the transmitting node on the basis of data read in from the SYN packet.

2. The method for identifying the TCP stack type of a transmitting node of claim 1, wherein the steps are performed at the receiving node.

3. The method for identifying the TCP stack type of a transmitting node of claim 1, wherein the step of identifying the transmission as a transmission that includes the SYN packet comprises identifying the SYN bit of the SYN packet as being set.

4. The method for identifying the TCP stack type of a transmitting node of claim 1, wherein the step of determining the TCP stack type of the transmitting node comprises the step of identifying the TCP stack type from a lookup table on the basis of the data read in from the SYN packet.

5. The method for identifying the TCP stack type of claim 1, further comprising identifying that the transmission includes an identification of the TCP stack type of the transmitting node.

6. A method for identifying the TCP stack type of a pair of nodes, wherein the nodes are communicatively coupled to one another, comprising:
    identifying the transmission of synchronization packets from each node,
    at each node, performing the steps of,
        identifying a transmission from a transmitting node as a transmission that includes a SYN packet;
        reading in from the SYN packet an identification of the TCP stack type of the transmitting node, wherein the identification is read from a data field of the SYN packet, and wherein the identification of the TCP stack type is based, at least in part, on multiple bits of information; and
        determining the TCP stack type of the transmitting node on the basis of data read in from the SYN packet.

7. The method for identifying the TCP stack type of a pair of nodes of claim 6, wherein each node in the pair of nodes identifies the TCP stack type of the opposite node.

8. The method for identifying the TCP stack type of a pair of nodes of claim 6, wherein the step performed at each node of identifying the transmission as a transmission that includes the SYN packet comprises identifying the SYN bit of the SYN packet as being set.

9. The method for identifying the TCP stack type of a pair of nodes of claim 6, wherein the step performed at each node of determining the TCP stack type of the transmitting node comprises the step of identifying the TCP stack type from a lookup table on the basis of the data read in from the SYN packet.

10. The method for identifying the TCP stack type of claim 6, further comprising identifying that the transmission includes an identification of the TCP stack type of the transmitting node.

11. A method for identifying the TCP stack type associated with a transmission, comprising:
    identifying a transmission that includes a SYN packet;
    reading in from the SYN packet an identification of the TCP stack type associated with the transmission, wherein the identification is read from a data field of the SYN packet, and wherein the identification of the TCP stack type is based, at least in part, on multiple bits of information; and
    determining the TCP stack type associated with the transmission on the basis of data read in from the SYN packet.

12. The method for identifying the TCP stack type associated with a transmission of claim 11, wherein the step of identifying the transmission that includes the SYN packet comprises identifying the SYN bit of the SYN packet as being set.

13. The method for identifying the TCP stack type associated with a transmission of claim 11, wherein the step of determining the TCP stack type associated with the transmission comprises the step of identifying the TCP stack type from a lookup table on the basis of the data read in from the transmission.

14. The method for identifying the TCP stack type of claim 11, further comprising identifying that the transmission includes an identification of the TCP stack type of a transmitting node.

* * * * *